US008889264B2

(12) United States Patent
Satoh et al.

(10) Patent No.: US 8,889,264 B2
(45) Date of Patent: Nov. 18, 2014

(54) HOT DIP PLATED HIGH STRENGTH STEEL SHEET FOR PRESS FORMING USE SUPERIOR IN LOW TEMPERATURE TOUGHNESS

(75) Inventors: Hironori Satoh, Tokyo (JP); Masayuki Abe, Tokyo (JP); Yasuto Goto, Tokyo (JP); Shinichi Yamaguchi, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 523 days.

(21) Appl. No.: 12/450,791

(22) PCT Filed: Apr. 11, 2008

(86) PCT No.: PCT/JP2008/057564
§ 371 (c)(1),
(2), (4) Date: Nov. 18, 2009

(87) PCT Pub. No.: WO2008/126945
PCT Pub. Date: Oct. 23, 2008

(65) Prior Publication Data
US 2010/0104890 A1 Apr. 29, 2010

(30) Foreign Application Priority Data
Apr. 11, 2007 (JP) .................................. 2007-103745

(51) Int. Cl.
*B32B 15/01* (2006.01)
*B32B 15/04* (2006.01)
(Continued)

(52) U.S. Cl.
CPC .............. *C22C 38/004* (2013.01); *C22C 38/28* (2013.01); *C22C 38/14* (2013.01); *C22C 38/54*
(Continued)

(58) Field of Classification Search
USPC ......... 428/648, 650, 652, 653, 659, 684, 685, 428/219, 332, 340
See application file for complete search history.

(56) References Cited

U.S. PATENT DOCUMENTS

2006/0003180 A1* 1/2006 Goto et al. ................... 428/648

FOREIGN PATENT DOCUMENTS

| CA | 2632112 | 7/2007 |
| CN | 1703529 | 11/2005 |

(Continued)

OTHER PUBLICATIONS

Machine Translation, Satou et al., JP 2007-277714, Oct. 2007.*

(Continued)

*Primary Examiner* — Michael E La Villa
(74) *Attorney, Agent, or Firm* — Kenyon & Kenyon LLP (57) ABSTRACT

The present invention provides a hot dip plated high strength steel sheet comprising a cold rolled steel sheet and a hot dip plated layer formed on the surface thereof, characterized in that the cold rolled steel sheet contains, by mass %, C: 0.0005 to 0.0050%, Si: over 0.3 to 1.0%, Mn: 0.70 to 2.0%, P: 0.05% or less, Ti: 0.010 to 0.050%, Nb: 0.010 to 0.040%, B: 0.0005 to 0.0030%, S: 0.010% or less, Al: 0.01 to 0.30%, and N: 0.0010 to 0.01%, and a balance of Fe and unavoidable impurities, and the cold rolled steel sheet has a value of TB* defined by the equation $TB^*=(0.11-[Ti])/(\ln([B]\times 10000))$ of 0.03 to 0.06, and P is present in an amount of $[P] \leq 10 \times [B] + 0.03$, where [Ti] is the Ti content in mass percent, [B] is the B content in mass percent, and [P] is the P content in mass percent.

4 Claims, 4 Drawing Sheets (51) Int. Cl.
*B32B 15/18* (2006.01)
*B32B 15/20* (2006.01)
*C21D 8/02* (2006.01)
*C22C 38/00* (2006.01)
*C22C 38/28* (2006.01)
*C22C 38/14* (2006.01)
*C22C 38/54* (2006.01)
*C22C 38/58* (2006.01)
*C22C 38/48* (2006.01)
*C22C 38/04* (2006.01)
*C22C 38/26* (2006.01)
*C22C 38/20* (2006.01)
*C22C 38/32* (2006.01)
*C22C 38/60* (2006.01)
*C21D 8/04* (2006.01)
*C22C 38/42* (2006.01)
*C22C 23/00* (2006.01)
*C22C 38/38* (2006.01)
*C22C 38/06* (2006.01)
*C22C 38/12* (2006.01)
*C22C 38/22* (2006.01)
*C21D 9/46* (2006.01)
*C22C 38/50* (2006.01)
*C22C 38/44* (2006.01)
*C23C 2/00* (2006.01)
*C22C 38/02* (2006.01)

(52) U.S. Cl.
CPC ........ (2013.01); *C22C 38/58* (2013.01); *B32B 15/013* (2013.01); *C22C 38/48* (2013.01); *C22C 38/04* (2013.01); *C22C 38/001* (2013.01); *C21D 8/0226* (2013.01); *C22C 38/26* (2013.01); *C22C 38/20* (2013.01); *C22C 38/32* (2013.01); *C22C 38/60* (2013.01); *C21D 8/0426* (2013.01); *C22C 38/42* (2013.01); *C21D 8/0436* (2013.01); *C22C 23/00* (2013.01); *C22C 38/38* (2013.01); *C22C 38/06* (2013.01); *C22C 38/12* (2013.01); *C22C 38/22* (2013.01); *C21D 9/46* (2013.01); *C22C 38/50* (2013.01); *C22C 38/44* (2013.01); *C23C 2/00* (2013.01); *C22C 38/008* (2013.01); *C22C 38/02* (2013.01)
USPC ............................ 428/648; 428/659; 428/684

(56) References Cited

FOREIGN PATENT DOCUMENTS

| | | |
|---|---|---|
| JP | 05-59491 | 3/1993 |
| JP | 5-214487 | 8/1993 |
| JP | 5-247540 | 9/1993 |
| JP | 05-255807 | 10/1993 |
| JP | 06-57373 | 3/1994 |
| JP | 06-256900 | 9/1994 |
| JP | 07-188777 | 7/1995 |
| JP | 07-278745 | 10/1995 |
| JP | 08-269735 | 10/1996 |
| JP | 08-291364 | 11/1996 |
| JP | 2000-192188 | 7/2000 |
| JP | 2000-233248 | 8/2000 |
| JP | 2001-107143 | 4/2001 |
| JP | 2001-288534 | 10/2001 |
| JP | 2002-292791 | 10/2002 |
| JP | 2005-213552 | 8/2005 |
| JP | 2006-291272 | 10/2006 |
| JP | 2007-119808 | 5/2007 |
| JP | 2007-169738 | 7/2007 |
| JP | 2007-169739 | 7/2007 |
| JP | 2007-277713 | 10/2007 |
| JP | 2007-277714 | 10/2007 |
| WO | WO 96/30560 | 10/1996 |
| WO | WO 2004-033745 | 4/2004 |

OTHER PUBLICATIONS

Machine Translation, Satou et al., JP 2007-277713, Oct. 2007.*
Machine Translation, Oyagi et al., JP 08-269735, Oct. 1996.*
Machine Translation, Matsuoka et al., JP 2001-107143, Apr. 2001.*
Machine Translation, Yoshinaga, et al., JP 05-255807, Oct. 1993.*
Machine Translation, Tawara et al., JP 05-214487, Aug. 1993.*
International Search Report dated Jul. 15, 2008 issued in corresponding PCT Application No. PCT/JP2008/057564.
Kasamatsu et al. "Effect of Titanium and nitrogen on Toughness of Heat-Affected Zone of Steel Plate with Tensile Strength of 50 kg/mm$^2$ in High Heat input Welding", Journal of Iron and Steel Institute of Japan, vol. 65 (1979), No. 8, p. 1232-1241, cover.
Chinese Office Action dated day Sep. 9, 2010 issued in corresponding Chinese Application No. 200880011757.
Canadian Office Action dated Jun. 14, 2011 issued in corresponding Canadian Application No. 2,683,739.
Korean Office Action dated Jul. 13, 2011 issued in corresponding Japanese Application No. 08-269735.

* cited by examiner

HOT DIP PLATED HIGH STRENGTH STEEL SHEET FOR PRESS FORMING USE SUPERIOR IN LOW TEMPERATURE TOUGHNESS

This application is a national stage application of International Application No. PCT/JP2008/057564, filed 11 Apr. 2008, which claims priority to Japanese Application No. 2007-103745, filed 11 Apr. 2007, which is incorporated by reference in its entirety.

TECHNICAL FIELD

The present invention relates to hot dip plated high strength steel sheet for press forming use used in the fields of automobiles and consumer electrics and a method of production of the same, more particularly relates to hot dip plated high strength steel sheet for press forming use superior in low temperature toughness suitable for automobile fuel tank applications and a method of production of the same.

BACKGROUND ART

In recent years, steel sheet for automobile use has been made higher in strength for the purpose of improving fuel consumption by reducing the weight of the chassis. In steel sheet for fuel tanks as well, due to the reduction of weight of tanks and greater complexity of chassis design and, further, the locations where the fuel tanks are placed, fuel tanks are becoming more complicated in shape and superior formability and higher strength are being demanded. In the past, to satisfy both demands of better formability and higher strength, high strength IF (interstitial free) steel comprised of IF steel made of ultralow carbon steel to which carbonitride forming elements like Ti and Nb are added plus P, Si, Mn, and other solution strengthening elements has been developed.

Figure 1:
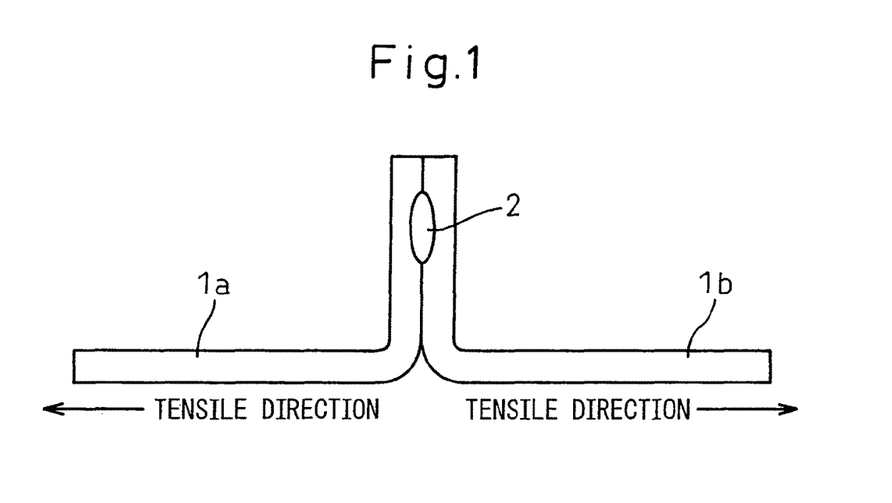
FIG. 1 is a cross-sectional view showing a test piece forming a coach peel seam weld zone in a peel test method.

However, when using high strength steel sheet for fuel tanks, there is the problem that the coach peel seam weld zone has a low tensile strength at a low temperature. That is, even if making steel sheet high in strength, there is the problem that the welded joint strength will not be high enough to match the increase in strength of the steel sheet. This is because a tank is produced by welding flange parts of upper and lower cup shaped parts and the seam weld zone of the tank is a coach peel shape as shown in FIG. 1 (where the cross-sectional shape is one where the flanges of the steel sheet are made to abut each other flat and seam welded, below, this weld zone also referred to as a "coach peel seam weld zone" or "coach peel weld zone"). In particular in the case of high strength steel sheet, the'stress easily concentrates, the toughness falls, and the tensile strength becomes lower. This becomes a concern in terms of the breakage resistance in the case where the fuel tank, an important part in safety, receives impact due to collision in a low temperature region.

Further, IF steel fixes the C, N, etc. by precipitation as carbides or nitrides of Nb or Ti, so there is the problem that the crystal grain boundaries become extremely clean and secondary work embrittlement easily occurs due to grain boundary fracture after forming. Further, in the case of high strength IF steel, the insides of the grains are strengthened by solution strengthening elements. The relative grain boundary strength falls remarkably, so there is also the problem of promotion of secondary work embrittlement.

Further, steel sheet free from the formation of corrosion products causing clogging of the filter and free from pitting corrosion with respect to gasoline and alcohol or organic acids which gasoline produces upon deterioration is also being sought. In response to these demands, in the past, steel sheet plated on its surface with Pb—Sn alloy, Al—Si alloy, Sn—Zn alloy, and Zn—Al alloy has been proposed and used. For this reason, the steel sheet used as the substrate has to be good in hot dip plateability by these alloys.

Among these problems, several methods have been proposed to avoid second work embrittlement (for example, see Japanese Patent Publication (A) No. 5-59491 and Japanese Patent Publication (A) No. 6-57373). For example, Japanese Patent Publication (A) No. 5-59491 proposes technology for avoiding the deterioration of the secondary work embrittlement resistance due to grain boundary segregation by reducing the P content as much as possible in Ti added IF steel and adding larger amounts of Mn and Si by that extent so as to obtain high strength steel sheet superior in secondary work embrittlement resistance. Further, Japanese Patent Publication (A) No. 6-57373 proposes the technology of using ultralow carbon steel sheet and adding B in addition to Ti and Nb to raise the grain boundary strength and improve the secondary work embrittlement resistance. In the technology described in this Japanese Patent Publication (A) No. 6-57373, the B content is optimized for the purpose of improving the secondary work embrittlement resistance and preventing an increase of the load at the time of hot rolling accompanying the delay in recrystallization of the austenite grains.

Further, several proposals have been made for the purpose of improving the weldability (for example, see Japanese Patent Publication (A) No. 7-188777, Japanese Patent Publication (A) No. 8-291364, and Japanese Patent Publication (A) No. 2001-288534). For example, the technology described in Japanese Patent Publication (A) No. 7-188777 carburizes ultralow carbon steel to which Ti and/or Nb has been added at the time of annealing and forms a martensite and bainite structure at the surface layer to try to improve the spot weldability. Further, the technology described in Japanese Patent Publication (A) No. 8-291364 adds Cu to the ultralow carbon steel and broadens the heat affected zone at the time of welding so as to raise the strength of spot welded joints.

Furthermore, the technology described in Japanese Patent Publication (A) No. 2001-288534 is technology adding Mg to steel to form Mg oxides and/or Mg sulfides in the steel sheet and thereby make the weld zone and heat affected zone finer in grain by the pinning effect. *ISIJ Journal*, vol. 65 (1979), no. 8, p. 1232 discloses the technology of finely dispersing TiN in thick steel sheet to improve the toughness of the heat affected zone of the weld zone.

Furthermore, several technologies for improving the hot dip plateability of high strength steel sheet have been proposed (see Japanese Patent Publication (A) No. 5-255807 and Japanese Patent Publication (A) No. 7-278745). For example, in the hot dip galvanized high strength cold rolled steel sheet described in Japanese Patent Publication (A) No. 5-255807, the content of elements inhibiting hot dip plateability is limited, that is, the content of S is limited to 0.03 mass % or less and the content of P to 0.01 to 0.12%, while Mn and Cr are positively added as strengthening elements. Further, in the high strength galvannealed steel sheet described in Japanese Patent Publication (A) No. 7-278745 improves the hot dip galvanization ability by making the interrelationship between the Si content and Mn content within a specific range.

To improve the secondary work embrittlement resistance, high strength steel sheet superior in secondary work embrittlement resistance is provided by adding B and optimizing the balance of addition of Mn—P (Japanese Patent Publication (A) No. 2000-192188). Further, to improve the secondary work embrittlement resistance, the technology of adding B, Ti, and Nb has also been disclosed (Japanese Patent Publication (A) No. 6-256900). Furthermore, technology relating to a welding method for improving the tensile strength of the coach peel weld zone distinctive to a tank (Japanese Patent Publication (A) No. 2007-119808) and technology relating to high strength steel sheet for drawing and pressing use (Japanese Patent Publication (A) No. 2007-169739, Japanese Patent Publication (A) No. 2007-169738, Japanese Patent Publication (A) No. 2007-277713, and Japanese Patent Publication (A) No. 2007-277714) have also been disclosed.

DISCLOSURE OF THE INVENTION

However, the prior art explained above had the following problems. That is, the steel sheets produced by the methods described in Japanese Patent Publication (A) No. 5-59491 and Japanese Patent Publication (A) No. 6-57373 are good in workability, but have the problems that if press formed under severe conditions such as with fuel tanks, the secondary work embrittlement resistance becomes insufficient and, furthermore, the coach peel weld zones of the welded joints obtained by welding these cold rolled steel sheets are low in strength.

Further, the method described in Japanese Patent Publication (A) No. 7-188777 performs carburization during the annealing, but there is the problem that in actual production facilities, the processing speed, the composition of the ambient gas, and the temperature are not constant, so the amount of carburization changes, the fluctuation in material quality between produced steel sheets becomes larger, and the stable production of steel sheet is difficult.

Furthermore, the method described in Japanese Patent Publication (A) No. 8-291364 adds a large amount of Cu, so there is the problem that many surface defects occur due to the Cu and the yield drops.

Further, the method described in Japanese Patent Publication (A) No. 2001-288534 and the *ISIJ Journal*, vol. 65 (1979), no. 8, p. 1232 is effective with arc welding etc. with a relatively slow cooling rate after welding, but has the problem that the effect cannot be recognized with the fast cooling rate seam welding etc. Further, the thick steel sheet and the thin steel sheet used for fuel tanks of Japanese Patent Publication (A) No. 2001-288534 and the *ISIJ Journal*, vol. 65 (1979), no. 8, p. 1232 differ in ingredients and further differ in shapes of weld zones, so cannot be said to be immediately applicable technology.

Further, the steel sheets described in Japanese Patent Publication (A) No. 5-255807 and Japanese Patent Publication (A) No. 7-278745 are good in hot dip galvanization ability, but have the problem of being insufficient in weldability and secondary work embrittlement resistance.

Japanese Patent Publication (A) No. 2000-192188 adds a large amount of P to secure the strength and does not optimize the balance of P and B, so has the defect that a sufficient low temperature toughness cannot be obtained.

Japanese Patent Publication (A) No. 6-256900 uses a large amount of Ti for improving the formability. It has the problems that the strength and toughness of the weld zone cannot be sufficiently secured and, further, even if the amount of addition of Ti is suitable, the amount of Nb is small, so sufficient workability cannot be secured.

Japanese Patent Publication (A) No. 2007-119808 is technology for using laser welding for improving the properties. With the seam welding used for production of fuel tanks, application is difficult. Further, it makes no allusion to technology for improving the weld zone properties by improvement of the matrix material properties.

Japanese Patent Publication (A) No. 2007-169739 and Japanese Patent Publication (A) No. 2007-169738 are art for improving the properties of the matrix material, but have the problems of low corrosion resistance and in addition, depending on the conditions, a low toughness of the coach peel seam weld zone, high steelmaking costs, and low workability.

Further, Japanese Patent Publication (A) No. 2007-277713 and Japanese Patent Publication (A) No. 2007-277714 have the problems of a low toughness of the coach peel seam weld zone depending on the conditions, while Japanese Patent Publication (A) No. 2007-277713 further has the problem that a drop in workability is incurred.

In this way, in past knowhow, there has been technology for improving the secondary work embrittlement resistance and improving the weld zone toughness in the field of thick steel sheet. However, fuel tanks are produced by a process including a working step such as press forming and a heat treatment step such as seam welding, so not only the properties of the matrix material, but also the properties after working and after heat treatment become important. That is, when using high strength steel, in general the toughness falls, so the secondary work embrittlement resistance and weld zone toughness simultaneously become important. Further, the surface is plated to form the final product, so the plateability and corrosion resistance also become important.

However, in the prior art, the technology for simultaneously improving all of the above items was not existed as explained above. In particular, there was no technology for improving the weld zone toughness having an effect on the tensile strength of the part obtained by seam welding the upper surface and lower surface obtained by press forming thin steel sheet, that is, the coach peel joint.

The present invention was made in consideration of the above problems and has as its object the provision of hot dip plated high strength steel sheet for press forming use having a tensile strength of 380 MPa to less than 540 MPa, having a press formability able to be used for the automobile field, in particular fuel tank applications, and having superior secondary work embrittlement resistance and superior seam weld zone low temperature toughness and further superior plateability and a method of production of the same.

Further, in recent years, use of biofuels has been increasing from the viewpoint of reducing $CO_2$. The following problems have arisen in selection of the materials for fuel tanks.

That is, in the past, if using galvanized steel sheet, when particularly using biodiesel fuel in biofuels, there were the problems that the Zn plating easily dissolved, the soot built up in the common rail, and the injector became clogged. On the other hand, if using Al plated steel sheet for biogasoline, there was the problem that the Al plating dissolved due to the alcohol contained in the gasoline. Further, there was the problem that if using plastic for a fuel tank, the biodiesel or biogasoline seeped into the fuel tank and leaked out from the fuel tank. In particular, these problems have been mainly due to the fact that biofuels produce more acids when broken down compared with conventional fuels, so become stronger in acidity than in the past.

Means for Solving the Problems

The present invention solves the above-mentioned problems as a result of study of the effects of Ti, B, and P on the toughness and secondary work embrittlement resistance of the coach peel seam weld zone unique to fuel tanks and the plateability. It has as its gist the following content described in the claims:

(1) Hot dip plated high strength steel sheet for press forming use superior in low temperature toughness having cold rolled steel sheet and a hot dip plated layer formed on the surface of said cold rolled steel sheet, characterized in that said cold rolled steel sheet contains, by mass %, C: 0.0005 to 0.0050%,
Si: over 0.3 to 1.0%,
Mn: 0.70 to 2.0%,
P: 0.05% or less,
Ti: 0.010 to 0.050%,
Nb: 0.010 to 0.040%,
B: 0.0005 to 0.0030%,
S: 0.010% or less,
Al: 0.01 to 0.30%, and
N: 0.0010 to 0.01% and comprises a balance of Fe and unavoidable impurities,
where the Ti content (%) is [Ti], the B content (%) is [B], and the P content (%) is [P], the TB* expressed by the following formula <A> being 0.03 to 0.06 and the following formula <B> being satisfied:

$$TB^* = (0.11 - [Ti])/(\ln([B] \times 10000)) \qquad <A>$$

$$[P] \leq 10 \times [B] + 0.03 \qquad <B>$$

(2) Hot dip plated high strength steel sheet for press forming use superior in low temperature toughness as set forth in (1), characterized in that said cold rolled steel sheet further contains, by mass %, one or more of Cu: 0.01 to 1%,
Ni: 0.01 to 1%,
Cr: 0.01 to 1%, and
Mo: 0.001 to 1%.

(3) Hot dip plated high strength steel sheet for press forming use superior in low temperature toughness as set forth in (1) or (2), characterized in that said cold rolled steel sheet does not contain the elements of As, Sn, Pb, and Sb in amounts over the following amounts by mass % and does not contain the total amount of these elements exceeding 0.02%:

As: 0.012%
Sn: 0.010%
Pb: 0.004%
Sb: 0.004%

(4) Hot dip plated high strength steel sheet for press forming use superior in low temperature toughness as set forth in any one of (1) to (3), characterized in that the hot dip plated layer formed on the surface of said cold rolled steel sheet is comprised of 1 to 8.8% of Zn and a balance of Sn: 91.2 to 99.0% and unavoidable impurities and in that the amount of plating deposition is 10 to 150 g/m² per side.

(5) Hot dip plated high strength steel sheet for press forming use superior in low temperature toughness as set forth in any one of (1) to (4), characterized in that a temperature of secondary work embrittlement resistance after forming it by a drawing ratio of 1.9 is −50° C. or less.

(6) Hot dip plated high strength steel sheet for press forming use superior in low temperature toughness as set forth in any one of (1) to (5), wherein a ductility-embrittlement transition temperature in a tensile test of a coach peel seam weld zone is −40° C. or less.

(7) A method of production of hot dip plated high strength steel sheet for press forming use superior in low temperature toughness having a step of continuously casting molten steel of a composition of ingredients as set forth in any one of (1) to (3) to obtain a slab,
a step of hot rolling said slab under conditions of heating at 1050° C. to 1245° C. for within 5 hours, a finishing temperature of Ar₃ temperature to 910° C., and a coiling temperature of 750° C. or less to obtain a hot rolled coil,
a step of cold rolling said hot rolled coil by a cold rolling rate of 50% or more to obtain a cold rolled coil of a predetermined thickness, and
a step of annealing said cold rolled coil at a temperature of the recrystallization temperature or more and then hot dip plating the coil surface.

(8) A method of production of hot dip plated high strength steel sheet for press forming use superior in low temperature toughness as set forth in (7), having a step of annealing said cold rolled coil at a temperature of the recrystallization temperature or more and then hot dip plating the coil surface so that the layer comprises 1 to 8.8% of Zn and a balance of Sn: 91.2 to 99% and unavoidable impurities and the plating deposition becomes 10 to 150 g/m² per side.

(9) A method of production of hot dip plated high strength steel sheet for press forming use superior in low temperature toughness as set forth in (7) or (8), characterized by preplating Fe—Ni before the hot dip plating.

BEST MODE FOR CARRYING OUT THE INVENTION

Below, the best mode for carrying out the present invention will be explained in detail. Note that in the following explanation, the mass % in the composition will be described simply as "%".

The inventors engaged in intensive studies to obtain hot dip plated high strength steel sheet for press forming use superior in low temperature toughness having a superior press formability, extremely difficult in the prior art, and having superior secondary work embrittlement resistance and coach peel weld zone tensile strength and, further, superior plateability. As a result, they discovered that by making the contents of the Ti, B, and P within specific ranges, it is possible to realize a tensile strength of 380 MPa to less than 540 MPa, a press formability enabling application to the automotive field, in particular fuel tank applications, superior secondary work embrittlement resistance and coach peel weld zone tensile strength, and further superior plateability and thereby reached the present invention.

That is, the hot dip plated high strength steel sheet for press forming use of the present invention (hereinafter referred to simply as "hot dip plated steel sheet") has cold rolled steel sheet and a hot dip plated layer formed on the surface of said cold rolled steel sheet and is characterized in that said cold rolled steel sheet contains, by mass %, C: 0.0005 to 0.0050%, Si: over 0.3 to 1.0%, Mn: 0.70 to 2.0%, P: 0.05% or less, Ti: 0.010 to 0.050%, Nb: 0.010 to 0.040%, B: 0.0005 to 0.0030%, S: 0.010% or less, Al: 0.01 to 0.30%, and N: 0.0010 to 0.01% and comprises a balance of Fe and unavoidable impurities, when the Ti content (%) is [Ti], the B content (%) is [B], and the P content (%) is [P], the TB* expressed by the following formula <A> being 0.03 or more and the following formula <B> being satisfied.

$$TB^* = (0.11 - [Ti])/(\ln([B] \times 10000)) \quad <A>$$

$$[P] \leq 10 \times [B] + 0.03 \quad <B>$$

First, the reasons for the numerical limitations in the hot dip plated steel sheet of the present invention will be explained.

<C: 0.0005 to 0.0050%>

C is an extremely important element in the present invention. Specifically, C is an element bonding with Nb and Ti to form carbides and extremely effective for achieving higher strength. However, if the C content is over 0.0050%, even if adding the Ti and Nb required for fixing the C, the workability falls and the coach peel seam weld zone toughness after seam welding and laser welding falls. On the other hand, in the hot dip plated steel sheet of the present invention, even if the C content is low, this can be compensated for by other strengthening methods, but if the C content is less than 0.0005%, securing the strength becomes difficult and the decarburization costs at the time of steelmaking rises. Accordingly, the C content is made 0.0005 to 0.0050%. Further, when an extremely high workability and weld zone toughness are required, the C content is preferably made 0.0030% or less.

<Si: Over 0.3 to 1.0%>

Si is an element effective for increasing strength as a solution strengthening element. In addition, the inventors discovered that by adding Si to over 0.3%, preferably 0.5% or more, the corrosion resistance after hot dip Sn—Zn plating is improved. The reason is that the solidified structure of the plating becomes finer. That is the $SiO_2$ formed by oxidation of the surface Si does not completely cover the surface in a layer, but is unevenly distributed on the surface, and this forms sites forming the nuclei for Sn primary crystals in the process of solidification of the hot dip Sn—Zn plating. The number of nuclei forming sites increases, so the Zn with its low corrosion potential and sacrificial corrosion proofing action becomes finer grained. For this reason, the Sn with the precious corrosion potential sufficiently surrounds the Zn, so the corrosion resistance is improved. Therefore, the lower limit is made 0.3%. Preferably, it is 0.5% or more. The reason why the corrosion resistance is low in Japanese Patent Publication (A) No. 2007-169739 and Japanese Patent Publication (A) No. 2007-169738 is believed to be that the Si is low. However, if the Si content becomes excessive, specifically if the Si content exceeds 1.0%, even if the other conditions are in the range of the present invention, the hot dip plateability is impaired. Therefore, the upper limit of the Si content is made 1.0%.

Biofuels are strongly corrosive. Improvement of the corrosion resistance would be very effective for a biofuel tank.

<Mn: 0.70 to 2.0%>

Mn, similar to Si, is an element raising the strength of the steel sheet by solution strengthening. It is one of the important elements for increasing the strength of the hop dip plated steel sheet of the present invention aimed at improvement of the secondary work embrittlement resistance, weld zone toughness, and hot dip plateability. Mn has a mechanism for raising the strength by making the structure finer and a mechanism for raising the strength by solution strengthening, but if the Mn content is less than 0.70%, the effect of its addition is not obtained. Further, if complemented by other elements, not all of the targets of secondary work embrittlement resistance, weld zone toughness, and hot dip plateability can be achieved. On the other hand, if the content of Mn exceeds 2.0%, the planar anisotropy of the r-value, the indicator of deep drawability, becomes large and the press formability is impaired. Further, Mn oxides are formed on the surface of the steel sheet and the hot dip plateability is impaired. Therefore, the Mn content is made 0.70 to 2.0%. Further, by making the Mn content 1.0% or more, even if the hot rolling finishing temperature is made 910° C. or less, it is possible to maintain the structure of the steel sheet, so the Mn content is preferably 1.0 to 2.0%.

<P: 0.05% or Less>

P is an element causing little deterioration of the workability even if added and effective for increasing the strength by solution strengthening. However, P is also an element segregating at the grain boundaries to cause deterioration of the secondary work embrittlement resistance and solidifying and segregating at the weld zone to cause deterioration of the coach peel seam weld zone toughness. Further, P segregates at the surface of the steel sheet and degrades the hot dip plateability by the heat history up to the hot dip plating. Specifically, if the P content exceeds 0.05%, segregation occurs. Therefore, the P content is restricted to 0.05% or less. Note that the lower limit of the P content does not particularly have to be defined, but if making the P content less than 0.005%, the refining cost becomes higher, so the P content is preferably made 0.005% or more. Further, from the viewpoint of securing the strength, 0.02% or more is preferable.

<Ti: 0.010 to 0.050%>

Ti has a high affinity with C and N and has the effect of forming carbonitrides at the time of solidification or hot rolling, reducing the C and N dissolved in the steel, and improving the workability. However, if the Ti content is less than 0.010%, this effect is not obtained. On the other hand, if the Ti content exceeds 0.050%, the strength and toughness of the weld zone of the welded joint, that is, the coach peel seam weld zone toughness, deteriorate. Therefore, the Ti content is made 0.010 to 0.050%.

<Nb: 0.010 to 0.040%>

Nb, like Ti, has a high affinity with C and N and has the effect of forming carbonitrides at the time of solidification or hot rolling, reducing the C and N dissolved in the steel, and improving the workability. However, if the Nb content is less than 0.010%, this effect is not obtained. On the other hand, if the Nb content exceeds 0.040%, the recrystallization temperature becomes higher, high temperature annealing becomes necessary, and the welded joint deteriorates in toughness of the weld zone. Therefore, the Nb content is made 0.010 to 0.040%.

<B: 0.0005 to 0.0030%>

B is an element precipitating at the grain boundaries and thereby raising the grain boundary strength and improving the secondary work embrittlement resistance. However, when the B content is less than 0.0005%, the effect is not obtained. On the other hand, if the B content exceeds 0.0030%, at the time of welding, B segregates at the γ grain boundaries and suppresses ferrite transformation. The structure of the weld zone and its heat affected zone becomes a structure formed by low temperature transformation, so this weld zone and heat affected zone become hard, the toughness deteriorates, and, as a result, the coach peel seam weld zone toughness deteriorates.

Further, if adding a large amount of B, the ferrite transformation at the time of hot rolling is also suppressed and the result becomes hot rolled steel sheet of a structure formed by low temperature transformation, so the hot rolled steel sheet becomes higher in strength and the load at the time of cold rolling becomes higher.

Furthermore, if the B content exceeds 0.0030%, the recrystallization temperature rises, and high temperature annealing becomes necessary, so a rise in production costs is incurred, the planar anisotropy of the r-value, an indicator of the deep drawability, becomes greater, and the press formability deteriorates. Therefore, the B content is made 0.0005 to 0.0030%. Note that the preferable range of the B content is 0.0005 to 0.0015% from the above-mentioned reasons.

<S: 0.010% or Less>

S is an impurity unavoidably entering at the time of refining the steel. It bonds with the Mn and Ti to form precipitates and degrades the workability, so the S content is restricted to 0.010% or less. Note that reducing the S content to less than 0.0001% increases the production costs, so the S content is preferably made 0.0001% or more.

<Al: 0.01 to 0.30%>

Al is an element used as a deoxidizing material at the time of refining the steel, but if the Al content is less than 0.01%, the deoxidizing effect is not obtained. However, if the Al content exceeds 0.30%, a drop in the toughness of the coach peel seam weld zone or a drop in the workability is incurred. Therefore, the Al content is made 0.01 to 0.30%. In Japanese Patent Publication (A) No. 2007-169739, Japanese Patent Publication (A) No. 2007-169738, and Japanese Patent Publication (A) No. 2007-277713, there is the problem that since the Al is high, a drop in the weld zone toughness and a drop in the workability are incurred.

<N: 0.0010 to 0.01%>

N is an element unavoidably entering at the time of refining steel. Further, N forms nitrides with Ti, Al, and Nb. While not having a detrimental effect on workability, it degrades the weld zone toughness. For this reason, the N content must be limited to 0.01% or less. On the other hand, to make the N content less than 0.0010%, the production cost rises. Therefore, the N content is made 0.0010 to 0.01%.

<TB*: 0.03 or More>

$$TB^* = (0.11 - [Ti])/(\ln([B] \times 10000)) \qquad <A>$$

The inventors discovered that when the value of TB* defined by the above formula <A>, where the Ti content is [Ti] and the B content is [B], becomes small, the coach peel seam weld zone falls in tensile strength. When the value of this TB* is 0.03 or less, the drop in tensile strength at a low temperature becomes remarkable. The reason is that the low temperature toughness falls and embrittlement fracture occurs.

Below, the content of the experiments by which the inventors discovered this fact will be explained.

Figure 2:
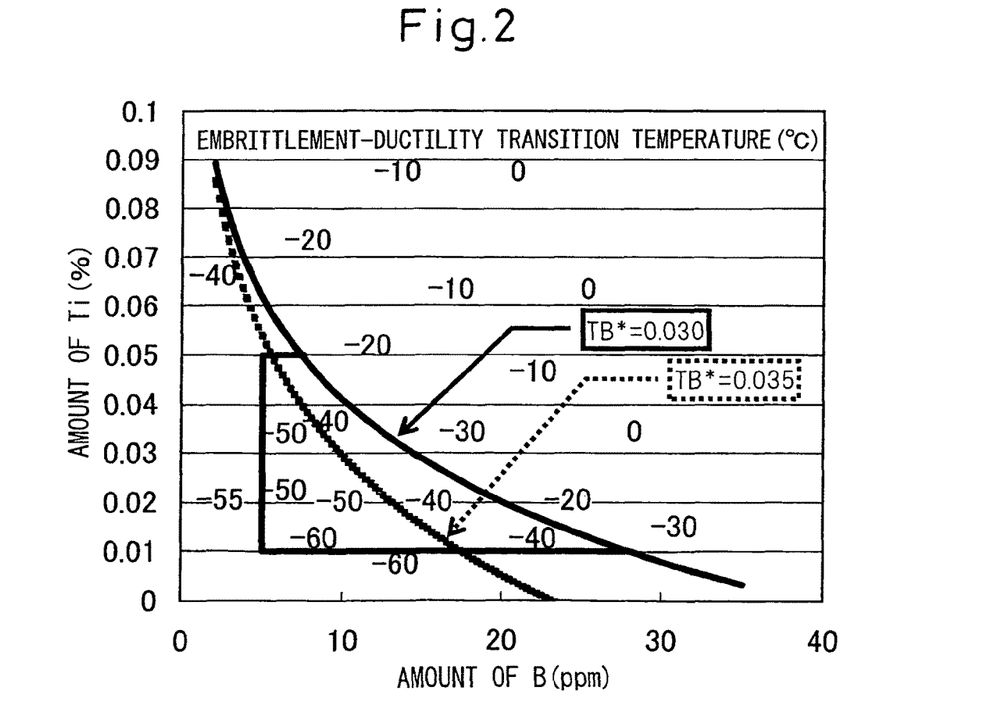
FIG. 2 is a view showing the effects of Ti and B on a ductility-embrittlement transition temperature of a coach peel seam weld zone.

The inventors first produced steels changed in compositions in the ranges of C: 0.0005 to 0.01%, Si: over 0.3 to 1.0%, Mn: 0.70 to 3.0%, P: 0.1% or less, Ti: 0.005 to 0.1%, Nb: 0.1% or less, B: 0.0001 to 0.004%, S: 0.010% or less, Al: 0.01 to 0.30%, and N: 0.0010 to 0.01% in a vacuum melting furnace, heated and held them at 1200° C. for 1 hour, then hot rolled them with a finishing temperature of 880 to 910° C. to a thickness of 3.7 mm to obtain hot rolled sheets. Next, each hot rolled sheet was pickled, then cold rolled to obtain a cold rolled sheet of a thickness of 1.2 mm. Furthermore, the cold rolled sheet was annealed by a cycle of holding it at a temperature of 800° C. for 60 seconds. This steel sheet was plated with Fe—Ni to 1 g/m², then plated with Sn—Zn by the flux method. The Fe—Ni alloy plating bath used was an Ni plating Watt bath to which 100 g/liter of iron sulfate was added. For the flux, a $ZnCl_2$—$NH_4Cl$ aqueous solution was coated by a roll. The content of Zn of the plating bath was 7 wt %. The plating bath temperature was made 280° C. The plating deposition was adjusted by gas wiping after plating. Furthermore, the steel sheet after the hot dip plating was treated mainly by $Cr^{3+}$ to obtain hot dip plated steel sheet. Next, this hot dip plated steel sheet was used to evaluate the toughness of the coach peel seam weld zone. For the evaluation, hot dip plated steel sheets 1a, 1b, as shown in FIG. 1, were bent to form flanges, the flanges were made to face each other (coach peel shape), and the facing part was seam welded to form a weld zone 2 (coach peel seam weld zone) to obtain a test piece. The part 1a and the part 1b were fixed by chucks. Tensile tests (peel tests) were run at a rate of 200 mm/min at various temperatures. After breakage, the fracture surfaces were examined. The temperature giving 50% each embrittlement fractures and ductility fractures was found as the ductility-embrittlement transition temperature. FIG. 2 is a graph plotting the B content on the abscissa and the Ti content on the ordinate and showing these element concentrations and the ductility-embrittlement transition temperature. The ductility-embrittlement transition temperature is preferably −40° C. or less corresponding to the lowest air temperature in cold regions where automobiles are used. −50° C. or less is more preferable.

FIG. 2 is a graph showing the effect of Ti and B on the ductility-embrittlement transition temperature.

The abscissa in FIG. 2 shows the amount of B (ppm), while the ordinate shows the amount of Ti (%).

As shown in FIG. 2, if the value of TB* defined by the following formula <A> where the Ti content (%) is [Ti] and the B content (%) is [B] is 0.03 or more, the ductility-embrittlement transition temperature can be made −40° C. or less. Further, 0.035 or more is more preferable.

$$TB^* = (0.11 - [Ti])/(\ln([B] \times 10000)) \qquad <A>$$

Figure 5:
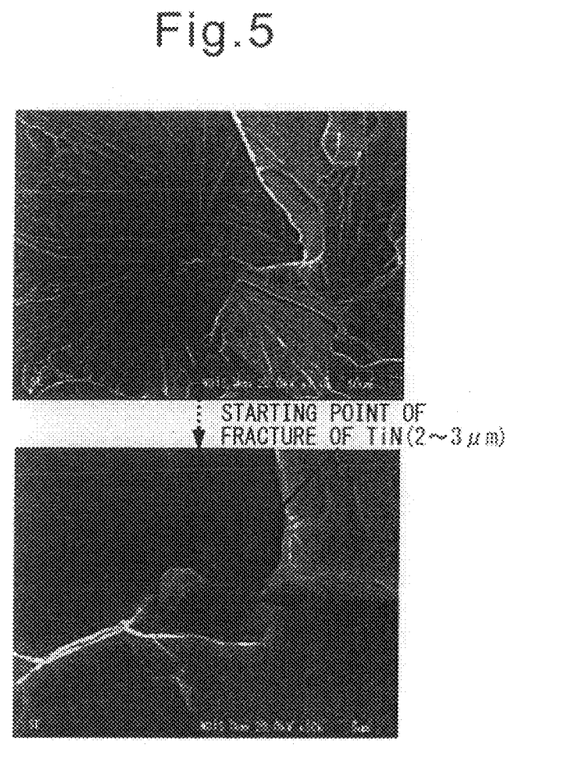
FIG. 5 is a photograph showing an example of the fracture face obtained by imparting impact for fracture after a heat treatment test simulating a weld heat affected zone.

The reasons why the above results are obtained are believed to be as follows: The first is that when the concentration of Ti is high, TiN is formed and becomes starting points for fracture. FIG. 5 is a photograph showing one example of a fracture surface obtained by fracture by giving impact after a heat treatment test simulating a weld heat affected zone. When the amount of Ti is large, TiN of sizes of about 2 to 3 µm become starting points of fracture. The second is that if B increases, the weld heat affected zone rises in hardness or the hardened region expands, so deformation becomes difficult when a tensile force acts on the coach peel weld zone as shown in FIG. 1. Stress partially concentrates due to this principle, so the stress becomes extremely high locally and is believed to lower the toughness. Due to the above experimental results and deductions, in the present invention, the value of TB* is made 0.03 or more, preferably 0.035 or more. The upper limit was made 0.06 due to the ranges of Ti and B.

$$<[P] \leq 10 \times [B] + 0.03 \qquad <B>>$$

The inventors discovered that by controlling the P content ([P]) and B content ([B]) to a specific relationship, the secondary work embrittlement resistance becomes excellent. Below, the content of the experiments discovering this fact will be explained.

The inventors first produced steels changed in compositions in the ranges of C: 0.0005 to 0.01%, Si: over 0.3 to 1.0%, Mn: 0.70 to 3.0%, P: 0.1% or less, Ti: 0.005 to 0.1%, Nb: 0.1% or less, B: 0.0001 to 0.004%, S: 0.010% or less, Al: 0.01 to 0.30%, and N: 0.0010 to 0.01% in a vacuum melting furnace, heated and held them at 1200° C. for 1 hour, then hot rolled them with a finishing temperature of 880 to 910° C. to a thickness of 3.7 mm to obtain hot rolled sheets.

Next, each hot rolled sheet was pickled, then cold rolled to obtain a cold rolled sheet of a thickness of 1.2 mm.

Furthermore, the cold rolled sheet was annealed by a cycle of holding it at a temperature of 800° C. for 60 seconds. This steel sheet was plated with Fe—Ni to 1 g/m², then plated with Sn—Zn by the flux method. The Fe—Ni alloy plating bath used was an Ni plating Watt bath to which 100 g/liter of iron sulfate was added. For the flux, a $ZnCl_2$—$NH_4Cl$ aqueous solution was coated by a roll. The content of Zn of the plating bath was 7 wt %. The plating bath temperature was made 280° C. The plating deposition was adjusted by gas wiping after plating. Furthermore, the steel sheet after the hot dip plating was treated mainly by $Cr^{3+}$ to obtain hot dip plated steel sheet.

Figure 3:
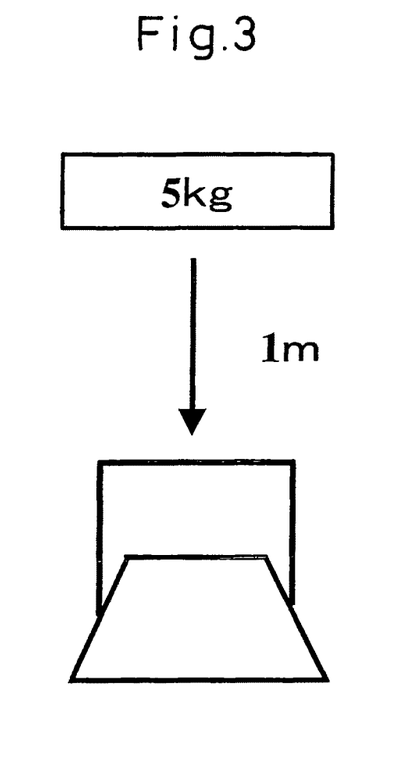
FIG. 3 is a view showing a test method for evaluation of secondary work embrittlement resistance.
Figure 4:
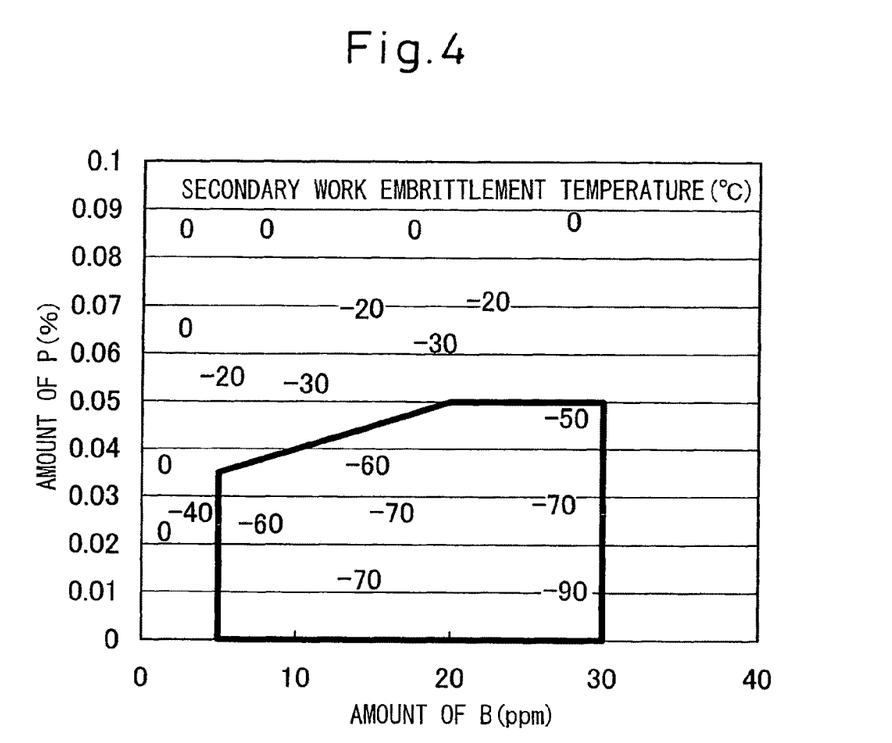
FIG. 4 is a view showing the effects of P and B on secondary work embrittlement resistance.

Next, this hot dip plated steel sheet was used to evaluate the secondary work embrittlement resistance temperature. The secondary work embrittlement resistance was evaluated by blanking hot dip plated steel sheet to a diameter of 95 mm so as to give a drawing ratio of 1.9, then drawing this by cylindrical cup drawing by a punch with an outside diameter of 50 mm, placing the drawing cup on a 30° conical base as shown in FIG. 3, dropping a weight of 5 kg from a position of a height of 1 m under various temperature conditions, and finding the lowest temperature where the cup does not crack (secondary work embrittlement resistance temperature). FIG. 4 is a graph plotting the B content on the abscissa and the P content on the ordinate P content and shows the element concentrations and secondary work embrittlement resistance temperature. The tank material is usually worked by an amount corresponding to a drawing ratio of 1.9 or less, so the secondary work embrittlement resistance temperature after shaping by a drawing ratio of 1.9 is preferably −40° C. or less corresponding to the lowest air temperature in cold regions where automobiles are used. Further, −50° C. or less is more preferable.

FIG. 4 is a graph showing the effects of P and B on the secondary work embrittlement resistance.

The abscissa in FIG. 4 shows the amount of B (ppm), while the ordinate shows the amount of P (%).

As shown in FIG. 4, by satisfying the following formula <B> where the P content (%) is [P] and the B content (%) is [B], it is possible to make the secondary work embrittlement resistance temperature after forming by a drawing ratio of 1.9 −50° C. or less:

$$[P] \leq 10 \times [B] + 0.03 \qquad <B>$$

<Cu: 0.01 to 1%, Ni: 0.01 to 1%, Cr: 0.01 to 1%, Mo: 0.001 to 1%>

The inventors discovered that by effectively utilizing Cu, Ni, Cr, and Mo, the tensile strength is secured, the YP is lowered, and the workability is improved.

However, with Cu, Ni, and Cr less than 0.01%, this effect is not obtained. With Mo less than 0.001%, this effect is not obtained. On the other hand, if over 1%, the alloy cost rises and a drop in the secondary work embrittlement resistance and coach peel weld zone toughness is incurred. Therefore, the elements of Cu, Ni, Cr, and Mo are made 0.01 to 1%.

<As0.012%, Sn0.010%, Pb≤0.004%, Sb≤0.004%, As+Sn+Pb+Sb0.02%>

The inventors discovered that the flange weld zone falls in toughness when the As easily segregating at the grain boundaries exceeds 0.012%, when Sn exceeds 0.010%, when Pb exceeds 0.004%, when Sb exceeds 0.004%, or when the total of As, Sn, Pb, and Sb exceeds 0.02%. Therefore, As is limited to 0.012%, Sn to 0.010%, Pb to 0.004%, and Sb to 0.004% as upper limits and the total of the As, Sn, Pb, and Sb is limited to 0.02% as the upper limit.

Note that the balance in the hot dip plated steel sheet of the present invention, that is, the ingredients other than the above elements, is comprised of Fe and unavoidable impurities.

In the hot dip plated steel sheet of the present invention, by making the content of the elements within specific ranges as explained above, it is possible to provide hot dip plated high strength steel sheet having a tensile strength of 380 MPa to less than 540 MPa, having press formability enabling use for the automobile field, in particular fuel tank applications, and superior in low temperature toughness and a method of production of the same. Due to these effects, increase of the strength of the steel sheet becomes possible, improvement of the fuel efficiency by the reduction in the weight of the automobile chassis becomes possible, and, in particular, reduction of the weight of the fuel tank and more complex chassis designs become possible. These effects are industrially extremely great.

Next, the method of production of hot dip plated steel sheet of the present invention will be explained. When producing the hot dip plated steel sheet of the present invention, first, materials prepared to give the above steel composition are charged into a converter or an electric furnace and treated by vacuum degassing to obtain slabs. Next, the slabs are hot rolled under conditions of heating at 1050° C. to 1245° C. within 5 hours, a finishing temperature of the $Ar_3$ temperature to 910° C., and a coiling temperature of 750° C. or less to obtain hot rolled coils. The heating for the hot rolling has to be at least 1050° C. for securing the rolling temperature. To suppress formation of coarse TiN causing a drop in toughness or suppress coarsening of the austenite grains and further to suppress the heating costs, the heating is performed at 1245° C. or less for 5 hours or less. In particular, coarse TiN leads to a drop in toughness of the coach peel seam weld zone, so limitation of the above TB* and the heating conditions are important. Japanese Patent Publication (A) No. 2007-277713 and Japanese Patent Publication (A) No. 2007-277714 are art for improving the properties of the matrix material, but depending on the heating conditions or TB* conditions, the coach peel seam weld zone falls in toughness. Further, if the finishing temperature in the hot rolling is less than the $Ar_3$ temperature, the workability of the steel sheet is impaired, so the finishing temperature of the hot rolling is made the $Ar_3$ temperature or more. Further, by making the finishing temperature in hot rolling 910° C. or less, it is possible to control the structure of the steel sheet and improve the low temperature toughness. Furthermore, if the coiling temperature after the hot rolling becomes a high temperature of over 750° C., the strength of the steel sheet after cold rolling and annealing falls, so the coiling temperature is made 750° C. or less.

Next, the hot rolled coil prepared by the above method is descaled in accordance with need, then cold rolled by a cold rolling rate of 50° C. or greater to obtain cold rolled coil of a predetermined sheet thickness. At this time, if the cold rolling rate is less than 50%, the strength of the steel sheet after annealing falls and the deep drawability deteriorates. Note that this cold rolling rate is preferably 65 to 80%. Due to this, hot dip plated steel sheet more superior in strength and deep drawability is obtained.

After this, the cold rolled coil is annealed at a temperature of the recrystallization temperature or more. At this time, when the annealing temperature is less than the recrystallization temperature, a good texture does not develop and the deep drawability deteriorates. On the other hand, if the annealing temperature becomes high, the strength of the steel sheet falls, so the annealing is preferably performed at a temperature of 850° C. or less.

Next, the surface of the cold rolled coil is hot dip plated to obtain hot dip plated steel sheet. This hot dip plating may be performed during the cooling after annealing or after reheating after annealing. Further, as the metal hot dip plated on the cold rolled coil surface, Zn, Zn alloy, Al, Al alloy, Sn—Zn, etc. may be mentioned.

But when stressing the corrosion resistance, the hot dip plating layer is preferably comprised of 1 to 8.8% of Zn and a balance of Sn: 91.2 to 99.0% and unavoidable impurities, and the plating deposition is preferably 10 to 150 g/m² per side. The reasons for limitation of the plating composition are as follows: First, there is the reason of limitation of Zn of the plating composition. This is limited by the balance of the corrosion resistance at the inside surface and outside surface of the fuel tank. The outside surface of a fuel tank requires complete rust proofing ability, so the fuel tank is painted after being shaped. Therefore, the coating thickness determines the rust proofing ability. But in the material Red rust is prevented by the corrosion proofing effect of the plating layer. In particular, at locations with poor reach of the paint, the corrosion proofing effect of this plating layer becomes extremely important. Zn is added to an Sn-base plating to lower the potential of the plating layer to impart a sacrificial corrosion proofing ability. For this reason, addition of 1 mass % or more of Zn is necessary. The addition of excessive Zn over 8.8 mass %, the Sn—Zn binary eutectic point, promotes growth of coarse Zn crystals, causes a rise in the melting point, leads to excessive growth of an intermetallic compound layer below the plating (so-called "alloy layer"), etc., so the amount must be 8.8 mass % or less. Coarse Zn crystals are not a problem in terms of the sacrificial corrosion proofing ability of Zn, but easily cause selective corrosion at coarse Zn crystal parts. Further, the growth of an intermetallic compound layer below the plating leads to easier plating cracking at the time of press forming and lower corrosion proofing effect of the plating layer since intermetallic compounds themselves are extremely brittle.

On the other hand, corrosion at the inside surface of a fuel tank is not a problem in the case of just ordinary gasoline, but the entry of water, entry of chlorine ions, oxidation and degradation of gasoline and resultant production of organic carboxylic acids etc. may create a severer corrosive environment. If pitting corrosion causes gasoline to leak to the outside of the fuel tank, it might lead to a serious accident. Such corrosion must therefore be completely prevented. The inventors prepared degraded gasoline containing the above corrosion promoting ingredients and examined the performance of steel sheet under various conditions, whereupon it was confirmed that an Sn—Zn alloy plating containing Zn: 8.8 mass % or less exhibits extremely superior corrosion resistance.

In the case of pure Sn not containing any Zn or a Zn content of less than 1 mass %, the plating metal has no sacrificial corrosion proofing action against iron metal from the start when exposed in a corrosive environment, so corrosion at plating pinhole parts at the inside surface of the fuel tank and early formation of red rust at the outside surface of the tank become problems. On the other hand, if Zn is contained in a large amount exceeding 8.8 mass %, the Zn preferentially dissolves and corrosion products are produced in large amounts in a short time, so there is the problem of carburetors easily clogging.

Further, in terms of performance other than corrosion resistance, an increase in the Zn content causes the plating layer to decline in workability and detracts from the feature of an Sn-based plating, that is, good press formability. Further, an increase in the Zn content causes the melting point of the plating layer to rise and the solderability to greatly decline due to Zn oxides.

Therefore, the Zn content in the Sn—Zn alloy plating in present invention is preferably 1 to 8.8 mass % in range, more preferably, to obtain a sufficient sacrificial corrosion proofing action, 3.0 to 8.8 mass % in range.

With an amount of deposition of this Sn—Zn plating of 10 g/m² per side or less, a good corrosion resistance cannot be secured. Deposition of 150 g/m² or more causes a rise in the costs and leads to uneven thickness and pattern defects and a consequent decline in the weldability. Therefore, the amount of deposition of the Sn—Zn plating was made 10 to 150 g/m² per side.

Further, to improve the plateability, preplating by Fe—Ni before plating is effective for improving the wettability of the Sn—Zn plating, making the primary crystal Sn finer in grain, and improving the corrosion resistance. This preplating is important technology for effectively using Si and Mn, which degrade the plateability, to increase the strength. This is also the characterizing feature of the present application. A deposition at one side of 0.2 g/m² or more is preferable in terms of wettability by the plating, while the ratio of Ni is preferably 10 to 70 mass % from the viewpoint of making the primary crystal Sn finer. Further, the hot dip plated steel sheet prepared by the above method is furthermore, in accordance with need, electroplated on the surface, then shipped out. Even in the case of Zn, a Zn alloy, Al, an Al alloy, or other hot dip plating other than Sn—Zn, the Fe—Ni preplating has the effect of improving the wettability of the plating.

EXAMPLES

Below, examples and comparative examples of the present invention will be given to specifically explain the effects of the present invention.

In the examples, steels of the compositions shown in the following Table 1, Table 2 (Continuation 1 of Table 1), Table 3 (Continuation 2 of Table 1), and Table 4 (Continuation 3 of Table 1) were produced, were heated and held at 1240° C., then were hot rolled under conditions of a hot rolling finishing temperature of 860 to 910° C. and a coiling temperature of 630 to 670° C. to obtain hot rolled sheets of a thickness of 3.7 mm. Next, the hot rolled sheets were pickled, then cold rolled to obtain cold rolled sheets of a thickness of 1.2 mm.

Furthermore, the cold rolled sheets were annealed by a cycle of holding them at a temperature of 760 to 820° C. for 60 seconds to obtain annealed steel sheets. The steel sheets were plated with Fe—Ni to 1 g/m² per side, then plated with Sn—Zn by the flux method. The Fe—Ni alloy plating bath used was an Ni plating Watt bath to which 100 g/liter of iron sulfate was added. For the flux, a $ZnCl_2$—$NH_4Cl$ aqueous solution was coated by a roll. The composition of the Zn of the plating bath was made like in Table 5. The bath temperature was made 280° C. The plating deposition (per side) was adjusted as in Table 5 by gas wiping after plating. Furthermore, the steel sheets after hot dip plating were treated mainly by $CP^{3+}$ to obtain the hot dip Sn—Zn plated steel sheets of the invention examples and comparative examples. Further, some of the steel sheets were hot dip galvanized during the cooling after said annealing. Note that the balances in the steel compositions shown in the following Tables 1 to 4 were Fe and unavoidable impurities. Further, the underlines in the following Tables 1 to 4 show values outside the range of the present invention.

TABLE 1

|  | Steel no. | C | Si | Mn | P | S | Al | Ti | Nb | B | N |
|---|---|---|---|---|---|---|---|---|---|---|---|
| Inv. ex. | 1 | 0.0025 | 0.65 | 1.23 | 0.041 | 0.003 | 0.030 | 0.018 | 0.030 | 0.0013 | 0.0023 |
|  | 2 | 0.0006 | 0.82 | 1.46 | 0.049 | 0.002 | 0.043 | 0.011 | 0.025 | 0.0023 | 0.0025 |
|  | 3 | 0.0022 | 0.62 | 1.02 | 0.034 | 0.004 | 0.051 | 0.024 | 0.018 | 0.0008 | 0.0021 |
|  | 4 | 0.0021 | 0.65 | 1.36 | 0.007 | 0.002 | 0.055 | 0.018 | 0.015 | 0.0007 | 0.0025 |
|  | 5 | 0.0029 | 0.31 | 1.58 | 0.040 | 0.005 | 0.030 | 0.028 | 0.035 | 0.0015 | 0.0037 |
|  | 6 | 0.0020 | 0.70 | 1.39 | 0.032 | 0.002 | 0.045 | 0.020 | 0.029 | 0.0013 | 0.0020 |
|  | 7 | 0.0015 | 0.93 | 1.22 | 0.018 | 0.003 | 0.034 | 0.012 | 0.039 | 0.0025 | 0.0011 |
|  | 8 | 0.0024 | 0.55 | 1.03 | 0.035 | 0.004 | 0.049 | 0.022 | 0.025 | 0.0019 | 0.0012 |
|  | 9 | 0.0010 | 0.90 | 0.75 | 0.025 | 0.003 | 0.030 | 0.015 | 0.025 | 0.0010 | 0.0010 |
|  | 10 | 0.0030 | 0.80 | 1.45 | 0.015 | 0.003 | 0.150 | 0.025 | 0.035 | 0.0015 | 0.0040 |
|  | 11 | 0.0022 | 0.70 | 1.37 | 0.032 | 0.003 | 0.047 | 0.022 | 0.030 | 0.0013 | 0.0020 |
|  | 12 | 0.0020 | 0.55 | 1.20 | 0.027 | 0.005 | 0.062 | 0.010 | 0.015 | 0.0024 | 0.0020 |
|  | 13 | 0.0013 | 0.70 | 1.50 | 0.010 | 0.002 | 0.053 | 0.021 | 0.038 | 0.0005 | 0.0042 |
|  | 14 | 0.0030 | 0.45 | 2.00 | 0.011 | 0.001 | 0.072 | 0.010 | 0.024 | 0.0029 | 0.0035 |
|  | 15 | 0.0048 | 1.00 | 0.82 | 0.031 | 0.006 | 0.041 | 0.015 | 0.030 | 0.0007 | 0.0034 |
|  | 16 | 0.0040 | 0.65 | 1.35 | 0.010 | 0.004 | 0.035 | 0.029 | 0.033 | 0.0008 | 0.0005 |
|  | 17 | 0.0035 | 0.61 | 1.03 | 0.021 | 0.002 | 0.050 | 0.022 | 0.020 | 0.0006 | 0.0033 |
|  | 18 | 0.0018 | 0.76 | 1.56 | 0.014 | 0.004 | 0.046 | 0.010 | 0.024 | 0.0024 | 0.0021 |
|  | 19 | 0.0034 | 0.52 | 1.12 | 0.031 | 0.002 | 0.049 | 0.016 | 0.016 | 0.0018 | 0.0027 |
|  | 20 | 0.0022 | 0.72 | 0.89 | 0.022 | 0.001 | 0.036 | 0.019 | 0.026 | 0.0013 | 0.0017 |

TABLE 2

(Continuation 1 of Table 1)

|  | Cu | Ni | Cr | Mo | As | Sn | Pb | Sb | As + Sn + Pb + Sb | TB* | 10 × [B] + 0.03 |
|---|---|---|---|---|---|---|---|---|---|---|---|
| Inv. ex, | — | — | — | — | — | — | — | — | — | 0.036 | 0.043 |
|  | — | — | — | — | — | — | — | — | — | 0.032 | 0.053 |
|  | — | — | — | — | — | — | — | — | — | 0.041 | 0.038 |
|  | 0.02 | — | — | — | — | — | — | — | — | 0.047 | 0.037 |
|  | — | 0.030 | — | — | — | — | — | — | — | 0.030 | 0.045 |
|  | — | — | 0.040 | — | — | — | — | — | — | 0.035 | 0.043 |
|  | — | — | — | 0.005 | — | — | — | — | — | 0.030 | 0.055 |
|  | — | 0.020 | 0.020 | — | — | — | — | — | — | 0.030 | 0.049 |
|  | 0.21 | 0.02 | — | — | — | — | — | — | — | 0.041 | 0.040 |
|  | — | — | 0.22 | 0.18 | — | — | — | — | — | 0.031 | 0.045 |
|  | 0.02 | — | — | 0.005 | — | — | — | — | — | 0.034 | 0.043 |
|  | — | 0.28 | 0.18 | 0.20 | — | — | — | — | — | 0.031 | 0.054 |
|  | 0.01 | 0.28 | 0.02 | — | — | — | — | — | — | 0.055 | 0.035 |
|  | 0.02 | 0.48 | 0.18 | 0.15 | — | — | — | — | — | 0.030 | 0.059 |
|  | 0.02 | — | — | — | 0.002 | — | — | — | 0.002 | 0.049 | 0.037 |
|  | — | — | 0.18 | 0.20 | — | 0.004 | — | — | 0.004 | 0.039 | 0.038 |
|  | 0.01 | 0.28 | — | — | — | — | 0.002 | — | 0.002 | 0.049 | 0.036 |
|  | — | 0.48 | 0.18 | 0.15 | — | — | — | 0.001 | 0.001 | 0.031 | 0.054 |
|  | 0.21 | 0.02 | 0.31 | — | 0.010 | 0.001 | — | — | 0.011 | 0.033 | 0.048 |
|  | 0.02 | 0.90 | 0.05 | 0.005 | 0.002 | 0.005 | 0.002 | 0.003 | 0.012 | 0.035 | 0.043 |

TABLE 3

(Continuation 2 of Table 1)

|  | Steel no. | C | Si | Mn | P | S | Al | Ti | Nb | B | N |
|---|---|---|---|---|---|---|---|---|---|---|---|
| Comp. ex. | 21 | 0.0068 | 0.51 | 1.32 | 0.045 | 0.003 | 0.030 | 0.021 | 0.035 | 0.0020 | 0.0025 |
|  | 22 | 0.0014 | 1.36 | 0.70 | 0.050 | 0.002 | 0.044 | 0.010 | 0.018 | 0.0029 | 0.0031 |
|  | 23 | 0.0011 | 0.44 | 2.32 | 0.036 | 0.004 | 0.065 | 0.022 | 0.022 | 0.0011 | 0.0028 |
|  | 24 | 0.0035 | 0.33 | 0.85 | 0.081 | 0.005 | 0.025 | 0.024 | 0.020 | 0.0008 | 0.0026 |
|  | 25 | 0.0024 | 0.86 | 1.02 | 0.015 | 0.003 | 0.066 | 0.004 | 0.033 | 0.0027 | 0.0022 |
|  | 26 | 0.0032 | 0.99 | 0.71 | 0.035 | 0.004 | 0.025 | 0.088 | 0.031 | 0.0022 | 0.0030 |
|  | 27 | 0.0022 | 0.45 | 1.55 | 0.033 | 0.002 | 0.041 | 0.026 | 0.003 | 0.0015 | 0.0041 |
|  | 28 | 0.0023 | 0.69 | 1.55 | 0.022 | 0.005 | 0.033 | 0.019 | 0.015 | 0.0003 | 0.0032 |
|  | 29 | 0.0024 | 0.87 | 1.40 | 0.025 | 0.004 | 0.029 | 0.018 | 0.013 | 0.0060 | 0.0020 |
|  | 30 | 0.0019 | 0.44 | 1.13 | 0.050 | 0.003 | 0.049 | 0.030 | 0.025 | 0.0010 | 0.0019 |
|  | 31 | 0.0031 | 0.62 | 0.93 | 0.062 | 0.002 | 0.037 | 0.024 | 0.030 | 0.0021 | 0.0015 |
|  | 32 | 0.0034 | 0.46 | 1.50 | 0.033 | 0.008 | 0.044 | 0.020 | 0.015 | 0.0015 | 0.0036 |
|  | 33 | 0.0005 | 0.78 | 0.98 | 0.027 | 0.002 | 0.033 | 0.013 | 0.025 | 0.0021 | 0.0067 |
|  | 34 | 0.0013 | 0.20 | 1.64 | 0.018 | 0.003 | 0.921 | 0.018 | 0.030 | 0.0012 | 0.0018 |
|  | 35 | 0.0035 | 0.35 | 1.34 | 0.050 | 0.004 | 0.076 | 0.023 | 0.034 | 0.0007 | 0.0023 |
|  | 36 | 0.0024 | 0.88 | 0.79 | 0.025 | 0.002 | 0.121 | 0.015 | 0.019 | 0.0016 | 0.0088 |

TABLE 3-continued (Continuation 2 of Table 1)

| Steel no. | C | Si | Mn | P | S | Al | Ti | Nb | B | N |
|---|---|---|---|---|---|---|---|---|---|---|
| 37 | 0.0019 | 0.97 | 1.05 | 0.045 | 0.009 | 0.037 | 0.017 | 0.022 | 0.0023 | 0.0046 |
| 38 | 0.0042 | 0.67 | 1.23 | 0.031 | 0.003 | 0.046 | 0.020 | 0.028 | 0.0009 | 0.0021 |

TABLE 4

(Continuation 3 of Table 1)

| | Cu | Ni | Cr | Mo | As | Sn | Pb | Sb | As + Sn + Pb + Sb | TB* | 10 × [B] + 0.03 |
|---|---|---|---|---|---|---|---|---|---|---|---|
| Comp. ex. | — | — | — | — | — | — | — | — | — | 0.030 | 0.050 |
| | — | — | — | — | — | — | — | — | — | 0.030 | 0.059 |
| | — | — | — | — | — | — | — | — | — | 0.037 | 0.041 |
| | — | — | — | — | — | — | — | — | — | 0.041 | 0.038 |
| | 0.01 | — | 0.02 | 0.005 | — | — | — | — | — | 0.032 | 0.057 |
| | — | 0.03 | 0.01 | 0.005 | — | — | — | — | — | 0.007 | 0.052 |
| | 0.02 | 0.01 | — | — | — | — | — | — | — | 0.031 | 0.045 |
| | — | 0.02 | — | 0.005 | 0.005 | — | — | 0.002 | 0.007 | 0.083 | 0.033 |
| | 0.02 | — | — | — | 0.001 | 0.005 | 0.003 | 0.003 | 0.012 | 0.022 | 0.090 |
| | 0.01 | 0.02 | — | 0.005 | 0.008 | 0.001 | 0.002 | — | 0.011 | 0.035 | 0.040 |
| | — | — | 0.02 | — | 0.001 | — | 0.002 | 0.001 | 0.004 | 0.028 | 0.051 |
| | — | 0.03 | — | — | 0.015 | — | — | — | 0.015 | 0.033 | 0.045 |
| | 0.15 | 0.02 | 0.24 | 0.006 | — | 0.015 | — | — | 0.015 | 0.032 | 0.051 |
| | — | 0.65 | — | 0.012 | — | — | 0.008 | — | 0.008 | 0.037 | 0.042 |
| | 0.01 | 0.04 | 0.05 | 0.008 | — | — | — | 0.017 | 0.017 | 0.045 | 0.037 |
| | 0.12 | 0.15 | — | 0.008 | 0.006 | 0.012 | 0.009 | 0.003 | 0.030 | 0.034 | 0.046 |
| | 0.03 | 0.01 | 0.55 | — | 0.014 | 0.004 | 0.003 | 0.010 | 0.031 | 0.030 | 0.053 |
| | — | 0.18 | 0.02 | 0.005 | 0.010 | 0.005 | 0.004 | 0.003 | 0.022 | 0.041 | 0.039 |

TABLE 5

| | Steel no. | Plating composition | Plating deposition |
|---|---|---|---|
| Inv. ex. | 1 | Sn-8 mass % Zn | 30 g/m² (one side) |
| | 2 | Sn-7 mass % Zn | 30 g/m² (one side) |
| | 3 | Sn-6 mass % Zn | 30 g/m² (one side) |
| | 4 | Zn | 40 g/m² (one side) |
| | 5 | Sn-4 mass % Zn | 45 g/m² (one side) |
| | 6 | Sn-3 mass % Zn | 30 g/m² (one side) |
| | 7 | Sn-8 mass % Zn | 50 g/m² (one side) |
| | 8 | Sn-7 mass % Zn | 65 g/m² (one side) |
| | 9 | Sn-6 mass % Zn | 70 g/m² (one side) |
| | 10 | Sn-5 mass % Zn | 70 g/m² (one side) |
| | 11 | Sn-4 mass % Zn | 60 g/m² (one side) |
| | 12 | Sn-3 mass % Zn | 80 g/m² (one side) |
| | 13 | Sn-2 mass % Zn | 30 g/m² (one side) |
| | 14 | Sn-2 mass % Zn | 80 g/m² (one side) |
| | 15 | Sn-7 mass % Zn | 120 g/m² (one side) |
| | 16 | Sn-7 mass % Zn | 130 g/m² (one side) |
| | 17 | Sn-7 mass % Zn | 12 g/m² (one side) |
| | 18 | Sn-7 mass % Zn | 145 g/m² (one side) |
| | 19 | Sn-1.2 mass % Zn | 30 g/m² (one side) |
| | 20 | Sn-8.5 mass % Zn | 30 g/m² (one side) |
| Comp. ex. | 21 | Sn-8 mass % Zn | 40 g/m² (one side) |
| | 22 | Sn-7 mass % Zn | 30 g/m² (one side) |
| | 23 | Sn-6 mass % Zn | 40 g/m² (one side) |
| | 24 | Sn-7 mass % Zn | 50 g/m² (one side) |
| | 25 | Sn-6 mass % Zn | 20 g/m² (one side) |
| | 26 | Sn-7 mass % Zn | 60 g/m² (one side) |
| | 27 | Zn | 40 g/m² (one side) |
| | 28 | Sn-0.5 mass % Zn | 100 g/m² (one side) |
| | 29 | Sn-15 mass % Zn | 30 g/m² (one side) |
| | 30 | Sn-7 mass % Zn | 200 g/m² (one side) |
| | 31 | Sn-7 mass % Zn | 5 g/m² (one side) |
| | 32 | Sn-7 mass % Zn | 30 g/m² (one side) |
| | 33 | Sn-7 mass % Zn | 30 g/m² (one side) |
| | 34 | Sn-7 mass % Zn | 30 g/m² (one side) |
| | 35 | Sn-7 mass % Zn | 30 g/m² (one side) |
| | 36 | Sn-7 mass % Zn | 30 g/m² (one side) |
| | 37 | Sn-7 mass % Zn | 30 g/m² (one side) |
| | 38 | Sn-7 mass % Zn | 30 g/m² (one side) |

Next, hot dip plated steel sheets of invention examples and comparative examples prepared by the above method were evaluated for tensile properties, the r-value, an indicator of deep drawability, the secondary work embrittlement resistance, the coach peel seam weld zone low temperature toughness, and the plateability. Below, the methods of evaluation will be explained.

The tensile properties were evaluated by conducting a tensile test using a JIS No. 5 test piece obtained from each hot dip plated steel sheet so that the tensile direction became parallel to the rolling direction and determining the tensile strength TS and elongation El. Further, a steel sheet with a tensile strength TS of 440 MPa or more and an elongation El of 33% or more was judged as passing.

The r-value was evaluated by obtaining a JIS No. 5 test piece from each hot dip plated steel sheet in each of the three directions of the direction parallel to the rolling direction, the direction 45° from it, and the direction perpendicular to it and measuring the r-value for each test piece. Further, when the r-value parallel to the rolling direction is $r_0$, the r-value in the 45° direction is $r_{45}$, and the r-value in the perpendicular direction is $r_{90}$, this was evaluated by the average value $r_{ave}$ of the directions found by the following formula <C>. Note that in this embodiment, a steel sheet with a $r_{ave}$ of 1.40 or more was judged as passing.

$$r_{ave} = (r_0 + 2 \times r_{45} + r_{90})/4 \qquad <C>$$

The secondary work embrittlement resistance was evaluated by blanking hot dip plated steel sheet to a diameter of 95 mm, then drawing this by cylindrical cup drawing by a punch with an outside diameter of 50 mm, placing the drawn cup on a 30° conical base as shown in FIG. 3, dropping a weight of 5 kg from a position of a height of 1 m under various temperature conditions, and finding the lowest temperature where the cup does not crack (secondary work embrittlement resistance temperature). This secondary work embrittlement resistance temperature changes depending on the thickness of the steel sheet and test method, but in the present embodiment where the thickness of the cold rolled steel sheet is 1.2 mm, −50° C. or less was judged as passing.

The toughness of the coach peel seam weld zone was evaluated by bending the flanges to the shape of the test piece shown in FIG. 1, fixing the part 1a and the part 1b by chucks, running tensile tests at a rate of 200 mm/min at various temperatures, examining the fracture surfaces after breakage, and finding the temperature giving 50% each embrittlement fractures and ductility fractures as the ductility-embrittlement transition temperature. In this embodiment, a steel sheet of −40° C. or less was judged as passing.

Further, the plateability was evaluated by visually observing the surface of hot dip plated steel sheet and examining the state of plating deposition. Specifically, steel sheets with no occurrence of nonplating defects were evaluated as "○ (good)" and steel sheets with nonplating defects as "X (poor)".

Further, the corrosion resistance was evaluated by simulating the inside surface of a fuel tank. The corrosion test solution was prepared by adding 10 vol % of water to forcibly degraded gasoline allowed to stand at 100° C. for 24 hours in a pressure vessel. Into 350 ml of this corrosive solution, hot dip plated steel sheet drawn with a bead (rate of reduction of thickness of 15%, 30 mm×35 mm, end face and back seal) was immersed for a 45° C.×3 week corrosion test and the amount of eluted Zn ions was measured. A steel sheet with an amount of elution of less than 200 ppm was judged as "⊚ (very good)", 200 to less 250 ppm as "○ (good)", 250 to 300 ppm as "Δ (fair)", and over 300 ppm as "X (poor)". The results of the above evaluations are shown all together in the following Table 6.

TABLE 6

| | Steel no. | Tensile properties | | | | Secondary work embrittlement resistance temperature (° C.) | Coach peel seam weld zone ductile-embrittlement transition temperature (° C.) | Plating | Corrosion resistance |
|---|---|---|---|---|---|---|---|---|---|
| | | Yield point YP (MPa) | Tensile strength TS (MPa) | Elongation El (MPa) | $r_{ave}$ | | | | |
| Inv. ex. | 1 | 332 | 452 | 36.3 | 1.63 | −50 | −50 | ○ | ⊚ |
| | 2 | 331 | 453 | 36.2 | 1.62 | −50 | −40 | ○ | ⊚ |
| | 3 | 334 | 462 | 35.1 | 1.61 | −50 | −50 | ○ | ⊚ |
| | 4 | 291 | 448 | 37.0 | 1.67 | −60 | −60 | ○ | Δ |
| | 5 | 294 | 452 | 36.1 | 1.61 | −60 | −40 | ○ | ○ |
| | 6 | 294 | 464 | 35.0 | 1.60 | −70 | −50 | ○ | ⊚ |
| | 7 | 301 | 467 | 34.0 | 1.56 | −80 | −40 | ○ | ⊚ |
| | 8 | 297 | 449 | 37.4 | 1.68 | −50 | −40 | ○ | ⊚ |
| | 9 | 301 | 453 | 36.4 | 1.64 | −60 | −60 | ○ | ⊚ |
| | 10 | 303 | 462 | 36.1 | 1.61 | −70 | −40 | ○ | ⊚ |
| | 11 | 298 | 443 | 38.0 | 1.69 | −60 | −40 | ○ | ⊚ |
| | 12 | 302 | 456 | 36.0 | 1.59 | −70 | −40 | ○ | ⊚ |
| | 13 | 305 | 461 | 36.4 | 1.63 | −60 | −40 | ○ | ⊚ |
| | 14 | 307 | 464 | 35.0 | 1.61 | −90 | −50 | ○ | ⊚ |
| | 15 | 305 | 459 | 35.9 | 1.64 | −60 | −40 | ○ | ⊚ |
| | 16 | 301 | 454 | 37.0 | 1.65 | −70 | −60 | ○ | ⊚ |
| | 17 | 304 | 464 | 35.2 | 1.62 | −60 | −50 | ○ | ⊚ |
| | 18 | 298 | 459 | 35.7 | 1.63 | −80 | −40 | ○ | ⊚ |
| | 19 | 301 | 454 | 36.9 | 1.63 | −70 | −40 | ○ | ⊚ |
| | 20 | 305 | 448 | 37.3 | 1.67 | −70 | −50 | ○ | ⊚ |
| Comp. ex. | 21 | 330 | 444 | 30.4 | 1.12 | −50 | −30 | ○ | ⊚ |
| | 22 | 335 | 484 | 33.2 | 1.54 | −50 | −30 | X | — |
| | 23 | 333 | 479 | 31.5 | 1.25 | −60 | −30 | X | — |
| | 24 | 336 | 445 | 37.5 | 1.63 | −10 | −10 | ○ | ○ |
| | 25 | 306 | 451 | 32.7 | 1.22 | −80 | −40 | ○ | ⊚ |
| | 26 | 306 | 450 | 32.4 | 1.38 | −60 | −10 | ○ | ⊚ |
| | 27 | 303 | 452 | 31.2 | 1.27 | −60 | −40 | ○ | Δ |
| | 28 | 307 | 461 | 36.2 | 1.57 | −20 | −60 | ○ | ⊚ |
| | 29 | 312 | 481 | 32.1 | 1.34 | −30 | −10 | ○ | ⊚ |
| | 30 | 298 | 460 | 36.3 | 1.64 | −30 | −30 | ○ | ⊚ |
| | 31 | 304 | 459 | 36.3 | 1.62 | −30 | −20 | ○ | ⊚ |
| | 32 | 304 | 453 | 37.2 | 1.63 | −40 | −20 | ○ | ⊚ |
| | 33 | 301 | 451 | 37.3 | 1.64 | −40 | −20 | ○ | ⊚ |
| | 34 | 293 | 445 | 37.5 | 1.67 | −50 | −30 | ○ | X |
| | 35 | 297 | 451 | 37.1 | 1.64 | −30 | −20 | ○ | ○ |
| | 36 | 301 | 453 | 36.7 | 1.61 | −40 | −20 | ○ | ⊚ |
| | 37 | 303 | 463 | 36.1 | 1.59 | −40 | −10 | ○ | ⊚ |
| | 38 | 312 | 459 | 37.0 | 1.63 | −40 | −20 | ○ | ⊚ |

As shown in the above Table 6, the hot dip plated steel sheet of No. 1 of the invention examples inside the range of the present invention had a good plateability, had superior working characteristics of an elongation El of 36.3% and an average value $r_{ave}$ of the r-value of 1.63, and was excellent in both secondary work embrittlement resistance temperature and ductility-embrittlement transition temperature of the flange seam weld zone at a low temperature.

The hot dip plated steel sheet of No. 2 of the invention examples inside the range of the present invention also had superior characteristics of an elongation El, an indicator of workability, of 36.2% and a $r_{ave}$ of a 1.62 and was superior in plateability, secondary work embrittlement resistance, and flange seam weld zone toughness.

The hot dip plated steel sheet of No. 3 of the invention examples inside the range of the present invention also had superior characteristics of an elongation El, an indicator of workability, of 35.1%, and a $r_{ave}$ of 1.61 and was superior in plateability, secondary work embrittlement resistance, and coach peel seam weld zone toughness.

The hot dip plated steel sheet of No. 4 of the invention examples inside the range of the present invention had a good plateability, had superior working characteristics of an elongation El of 37.0% and an average value $r_{ave}$ of the r-value of 1.67, and was superior in both secondary work embrittlement resistance temperature and a ductility-embrittlement transition temperature of a flange seam weld zone at a low temperature. However, since this is Zn plating, it is inferior in corrosion resistance compared with the other invention examples.

The hot dip plated steel sheet of No. 5 of the invention examples inside the range of the present invention also had superior characteristics of an elongation El, an indicator of workability, of 36.1% and a $r_{ave}$ of 1.61 and was also superior in plateability, secondary work embrittlement resistance, and coach peel seam weld zone toughness. However, Si is 0.31% or close to the lower limit and the corrosion resistance is somewhat inferior.

The hot dip plated steel sheet of No. 6 of the invention examples inside the range of the present invention also had superior characteristics of an elongation El, an indicator of workability, of 35.0% and a $r_{ave}$ of 1.60 and was also superior in plateability, secondary work embrittlement resistance and coach peel seam weld zone toughness.

The hot dip plated steel sheet of No. 7 of the invention examples inside the range of the present invention also had superior characteristics of an elongation El, an indicator of workability, of 34.0% and a $r_{ave}$ of 1.56 and was also superior in plateability, secondary work embrittlement resistance, and coach peel seam weld zone toughness.

The hot dip plated steel sheet of No. 8 of the invention examples inside the range of the present invention also had superior characteristics of an elongation El, an indicator of workability, of 37.4% and an $r_{ave}$ of 1.68 and was also superior in plateability, secondary work embrittlement resistance, and coach peel seam weld zone toughness.

Similarly, No. 9 to No. 20 also had superior workability, superior plateability, superior secondary work embrittlement resistance, and superior coach peel seam weld zone toughness. Note that No. 1 to No. 3 were higher in YP than the others since neither Cu, Ni, Cr, nor Mo were added.

As opposed to this, the hot dip plated steel sheet of No. 21 of the comparative examples with a C content outside the range of the present invention had an elongation El, an indicator of the workability, of a low 30.4%, an r-value of a low 1.12, an inferior workability compared to the above invention examples, and furthermore an inferior coach peel seam weld zone toughness.

Further, the hot dip plated steel sheet of No. 22 is a comparative example with an Si content outside the range of the present invention. This hot dip plated steel sheet suffered from non-plating defects at the time of hot dip plating and had an inferior plateability.

The hot dip plated steel sheet of No. 23 had an Mn content over the upper limit of the present invention, had an elongation El, an indicator of workability, and an r-value lower than the hot dip plated steel sheet of the above-mentioned invention examples, an inferior workability, and further an inferior plateability and coach peel seam weld zone toughness.

The hot dip plated steel sheet of No. 24 is a comparative example with a P content outside the range of the present invention and with a secondary work embrittlement resistance and coach peel seam weld zone toughness inferior to the hot dip plated steel sheet of the above-mentioned invention examples.

The hot dip plated steel sheet of No. 25 is a comparative example with a Ti content of less than the range of the present invention. This hot dip plated steel sheet was inferior in elongation El and r-value and was inferior in workability.

The hot dip plated steel sheet of No. 26 is a comparative example with a Ti content over the upper limit and with a TB* lower than the lower limit of the present invention. This hot dip plated steel sheet had a low elongation El and r-value and further a coach peel seam weld zone toughness inferior to the hot dip plated steel sheet of the above-mentioned invention examples.

The hot dip plated steel sheet of No. 27 is a comparative example with an Nb content less than the range of the present invention. This hot dip plated steel sheet had a low r-value and elongation El and did not match the object of the present invention of superior workability. Further, since hot dip Zn plating was used, it was inferior in corrosion resistance compared with the invention examples.

The hot dip plated steel sheet of No. 28 is a comparative invention with a B content of 0.0003%, or less than the lower limit of the present invention. This hot dip plated steel sheet had a secondary work embrittlement resistance temperature of −20° C., or inferior to the hot dip plated steel sheet of the above-mentioned invention examples. Further, it had a low Zn mass % of plating, so did not have a sufficient sacrificial corrosion proofing effect and was inferior in corrosion resistance of the outer surface.

The hot dip plated steel sheet of No. 29 is a comparative example with a B content over the range of the present invention. This hot dip plated steel sheet had a low elongation El, an indicator of workability, and a low r-value, also had a high ductility-embrittlement transition temperature of a coach peel seam weld zone, and was inferior in weld zone toughness. Furthermore, the Zn mass % of the plating was high, no Sn primary crystals appeared, and the Zn segregation of the eutectic cell grain boundaries and growth of coarse Zn crystals were aggravated, so the corrosion resistances at both the inside surface and outside surface fell.

The hot dip plated steel sheets of No. 30 and No. 31 are comparative examples with amounts of P over 10×[B]+0.03. These hot dip plated steel sheets had secondary work embrittlement resistance temperatures of −30° C., or inferior to the hot dip plated steel sheet of the above-mentioned invention examples, and were also low in coach peel seam weld zone toughness. Further, No. 31 had a small plating deposition and inferior corrosion resistance, while No. 30 had a large plating deposition and patterned shape and inferior surface properties and fell in weldability.

No. 32 to No. 38 are comparative examples with As, Sn, Pb, and Sb of As: 0.012%, Sn: 0.010%, Pb: 0.004%, and Sb: 0.004% or a total amount of these elements over 0.02% and fell in toughness of the coach peel seam weld zone.

Note that No. 35, in addition to the above, had an amount of P over 10×[B]+0.03 and was also poor in secondary work embrittlement resistance.

Further, No. 34 had a Si lower than the lower limit and was poor in corrosion resistance.

Note that No. 21 to No. 24 became higher in YP than the others since they had neither Cu, Ni, Cr, and Mo added to them.

Note that the inventors used biodiesel fuel and biogasoline to run corrosion resistance tests. The results were good.

Industrial Applicability

According to the present invention, by making the contents of Ti, B, and P within a specific range, it is possible to provide hot dip plated high strength steel sheet for press forming use superior in low temperature toughness having a tensile strength of 380 MPa to less than 540 MPa, having a press formability able to be used for the automobile field, in particular fuel tank applications, and having superior secondary work embrittlement resistance and tensile strength of the coach peel weld zone and a method of production of the same.

Furthermore, the fuel tank produced by the steel sheet of the present invention exhibits a superior effect at the time of particularly use of biofuels among automobile fuels.

The invention claimed is:

1. A hot dip Sn-Zn plated high strength steel sheet for press forming, superior in low temperature toughness, comprising a cold rolled steel sheet and a hot dip plated layer formed on the surface of the cold rolled steel sheet, the cold rolled steel sheet comprising, by mass %, C: 0.0005 to 0.0050%,
Si: 0.61 to 1.0%,
Mn: 0.70 to 1.39%,
P: 0.05% or less,
Ti: 0.010 to 0.018%,
Nb: 0.010 to 0.040%,
B: 0.0007 to 0.0021%,
S: 0.010% or less,
Al: 0.01 to 0.066%,
N: 0.0010 to 0.0041%, and
a balance of Fe and unavoidable impurities, wherein
P is present in an amount of [P]≤10×[B]+0.03, wherein [B] is the B content in mass percent, and [P] is the P content in mass percent.

2. The hot dip Sn-Zn plated high strength steel sheet as set forth in claim 1, wherein, when the hot dip plated high strength steel sheet is formed at a drawing ratio of 1.9, the hot dip plated high strength steel sheet has a secondary work embrittlement resistance temperature of −50° C. or less.

3. A hot dip Sn-Zn plated high strength steel sheet for press forming, superior in low temperature toughness, comprising a cold rolled steel sheet and a hot dip plated layer formed on the surface of the cold rolled steel sheet, the cold rolled steel sheet comprising, by mass %, C: 0.0005 to 0.0050%,
Si: 0.61 to 1.0%,
Mn: 0.70 to 1.39%,
P: 0.05% or less,
Ti: 0.010 to 0.013%,
Nb: 0.010 to 0.040%,
B: 0.0007 to 0.0025%,
S: 0.010% or less,
Al: 0.01 to 0.066%,
N: 0.0010 to 0.0041%, and
a balance of Fe and unavoidable impurities, wherein
P is present in an amount of [P]≤10×[B]+0.03, wherein [B] is the B content in mass percent, and [P] is the P content in mass percent.

4. The hot dip Sn-Zn plated high strength steel sheet as set forth in claim 3, wherein, when the hot dip plated high strength steel sheet is formed at a drawing ratio of 1.9, the hot dip plated high strength steel sheet has a secondary work embrittlement resistance temperature of −50° C. or less.

* * * * *

UNITED STATES PATENT AND TRADEMARK OFFICE
CERTIFICATE OF CORRECTION

PATENT NO. : 8,889,264 B2  Page 1 of 1
APPLICATION NO. : 12/450791
DATED : November 18, 2014
INVENTOR(S) : Hironori Satoh et al.

It is certified that error appears in the above-identified patent and that said Letters Patent is hereby corrected as shown below:

In the Specification

Column 1, line 50, change "steel sheet, the' stress" to -- steel sheet, the stress --;

Column 11, line 61, change "<As0.012%, Sn0.010%," to -- $As \leq 0.012\%$, $Sn \leq 0.010\%$, --;

Column 11, line 62, change "As+Sn+Pb+Sb0.02%>" to -- $As+Sn+Pb+Sn \leq 0.02\%$> --; and Column 14, line 60, change "by $CP^{3-}$" to -- by $Cr^{3+}$ --.

Signed and Sealed this
Fifteenth Day of September, 2015

Michelle K. Lee
*Director of the United States Patent and Trademark Office*